United States Patent
Chu et al.

(10) Patent No.: US 10,859,670 B2
(45) Date of Patent: Dec. 8, 2020

(54) GEOGRAPHIC POSITIONING USING SHORT-RANGE TRANSMISSIONS

(71) Applicant: Uber Technologies, Inc., San Francisco, CA (US)

(72) Inventors: Anson Chu, San Francisco, CA (US); Brandon Iles, Milpitas, CA (US); Dinesh Ramasamy, Mountain View, CA (US); Juthika Kiran Dabholkar, San Francisco, CA (US); Upamanyu Madhow, Santa Barbara, CA (US); William J. Salisbury, San Francisco, CA (US); Brent Hamby, Oakland, CA (US)

(73) Assignee: Uber Technologies, Inc., San Francisco, CA (US)

( * ) Notice: Subject to any disclaimer, the term of this patent is extended or adjusted under 35 U.S.C. 154(b) by 143 days.

(21) Appl. No.: 15/672,043

(22) Filed: Aug. 8, 2017

(65) Prior Publication Data
US 2019/0049552 A1 Feb. 14, 2019

(51) Int. Cl.
*G01S 5/14* (2006.01)
*H04W 84/00* (2009.01)
(Continued)

(52) U.S. Cl.
CPC .............. *G01S 5/14* (2013.01); *G01C 21/20* (2013.01); *G01C 21/362* (2013.01);
(Continued)

(58) Field of Classification Search
CPC .......... G01S 5/14; G01S 21/20; G01S 21/362; G01S 5/0252; G08G 1/123; G08G 1/005;
(Continued)

(56) References Cited

U.S. PATENT DOCUMENTS 6,832,092 B1 12/2004 Suarez et al.
8,320,939 B1 11/2012 Vincent
(Continued)

FOREIGN PATENT DOCUMENTS

| KR | 10-2010-0053717 A | 5/2010 |
| WO | WO 2004/013733 A2 | 2/2004 |
| WO | WO 2015/051132 A1 | 4/2015 |

OTHER PUBLICATIONS

Klein, Matt. "How to Disable Google Location Wi-Fi Scanning on Android", How-To Geek, published Mar. 6, 2015.*
(Continued)

*Primary Examiner* — Michael V Kerrigan
(74) *Attorney, Agent, or Firm* — Fenwick & West LLP (57) ABSTRACT

A network system uses Wi-Fi signals or other types of short-range transmissions to determine pickup locations for users receiving services provided via the network system. The network system builds a database of search records mapping pickup locations to signatures of short-range transmission detected by users' client devices when they searched for the pickup locations. By comparing a signature detected by a given user's client device to the signatures in the database, the network system can check for similarities between the short-range transmissions. Responsive to finding a match, the network system predicts that the given user is likely to select a similar pickup location as other users whose client devices detected the signatures corresponding to the match. Accordingly, by leveraging the database, the network system can predict pickup locations without requiring the given user to input a search for a pickup location.

18 Claims, 6 Drawing Sheets

(51) Int. Cl.

| | | |
|---|---|---|
| *G01S 5/02* | (2010.01) | |
| *H04W 4/02* | (2018.01) | |
| *G08G 1/00* | (2006.01) | |
| *G08G 1/005* | (2006.01) | |
| *H04W 4/029* | (2018.01) | |
| *H04W 4/80* | (2018.01) | |
| *G01C 21/20* | (2006.01) | |
| *G01C 21/36* | (2006.01) | |
| *G08G 1/123* | (2006.01) | |

(52) U.S. Cl.
CPC ............ *G01S 5/0252* (2013.01); *G08G 1/005* (2013.01); *G08G 1/123* (2013.01); *G08G 1/205* (2013.01); *H04W 4/02* (2013.01); *H04W 4/029* (2018.02); *H04W 4/80* (2018.02); *H04W 84/00* (2013.01)

(58) Field of Classification Search
CPC ........ G08G 1/205; H04W 4/029; H04W 4/80; H04W 84/00; H04W 4/02; G01C 21/20; G01C 21/362; G01C 21/3617
See application file for complete search history.

(56) References Cited

U.S. PATENT DOCUMENTS

| | | |
|---|---|---|
| 8,359,045 B1 | 1/2013 | Hopkins |
| 9,395,190 B1 | 7/2016 | Young et al. |
| 9,510,154 B2 | 11/2016 | Mori et al. |
| 9,716,974 B2 | 7/2017 | Yamasaki et al. |
| 10,032,181 B1 | 7/2018 | Madhow et al. |
| 10,234,305 B2 | 3/2019 | Madine et al. |
| 10,281,293 B2 | 5/2019 | Musabji et al. |
| 2006/0059023 A1 | 3/2006 | Mashinsky |
| 2006/0155460 A1 | 7/2006 | Raney |
| 2009/0156241 A1 | 6/2009 | Staffaroni et al. |
| 2009/0315704 A1 | 12/2009 | Rosing et al. |
| 2010/0114626 A1 | 5/2010 | Piccinini |
| 2010/0318294 A1 | 12/2010 | Rosing et al. |
| 2013/0006515 A1 | 1/2013 | Vellaikal et al. |
| 2013/0013381 A1 | 1/2013 | Liu |
| 2013/0073336 A1 | 3/2013 | Heath |
| 2013/0281111 A1 | 10/2013 | Syrajarinne et al. |
| 2014/0011518 A1 | 1/2014 | Valaee et al. |
| 2014/0045529 A1 | 2/2014 | Bolon et al. |
| 2014/0074536 A1 | 3/2014 | Meushar et al. |
| 2014/0179341 A1* | 6/2014 | Sydir ................ H04W 64/00 455/456.1 |
| 2014/0335893 A1 | 11/2014 | Ronen |
| 2014/0378159 A1 | 12/2014 | Dolbakian et al. |
| 2015/0254581 A1 | 9/2015 | Brahme |
| 2015/0279216 A1 | 10/2015 | Ghanma |
| 2016/0055605 A1 | 2/2016 | Kim et al. |
| 2016/0123748 A1 | 5/2016 | Chidlovskii |
| 2016/0195602 A1 | 7/2016 | Meadow |
| 2016/0203576 A1 | 7/2016 | Novak et al. |
| 2016/0232719 A1 | 8/2016 | Brinig et al. |
| 2016/0334235 A1 | 11/2016 | Gustafson et al. |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0011324 A1 | 1/2017 | Truong |
| 2017/0059347 A1* | 3/2017 | Flier ................ G06Q 10/08355 |
| 2017/0059353 A1 | 3/2017 | Madine et al. |
| 2017/0075536 A1 | 3/2017 | Cho et al. |
| 2017/0078380 A1 | 3/2017 | Aggarwal et al. |
| 2017/0104629 A1 | 4/2017 | Cobb |
| 2017/0129603 A1 | 5/2017 | Raptopoulos et al. |
| 2017/0147959 A1 | 5/2017 | Sweeney et al. |
| 2017/0186056 A1 | 6/2017 | Amin et al. |
| 2017/0227370 A1 | 8/2017 | O'Mahony et al. |
| 2017/0227371 A1 | 8/2017 | O'Mahony et al. |
| 2017/0370728 A1 | 12/2017 | Kordari et al. |
| 2020/0051442 A1 | 2/2020 | S. et al. |

OTHER PUBLICATIONS

PCT International Search Report and Written Opinion, PCT Application No. PCT/IB2018/054775, dated Dec. 13, 2018, 8 pages.
PCT International Search Report and Written Opinion, PCT Application No. PCT/IB2018/053672, dated Sep. 17, 2018, 18 pages.
United States Office Action, U.S. Appl. No. 16/016,501, dated Apr. 16, 2020, 17 pages.
United States Office Action, U.S. Appl. No. 16/016,504, dated Mar. 31, 2020, 15 pages.

* cited by examiner

GEOGRAPHIC POSITIONING USING SHORT-RANGE TRANSMISSIONS

BACKGROUND

1. Field

This disclosure generally relates to providing navigation to geographic locations for a network system, and more specifically to using signatures of short-range transmissions to determine pickup locations for services provided via the network system.

2. Description of the Related Art

In a network system, providers provide geographic location-based services to users, for example, a provider uses a vehicle to transport a user. Users can manually search for a pickup location, that is, the location at which they want the provider to pick them up to start a trip. However, searching for pickup locations may be difficult when the user is located somewhere that does not have reception of global positioning system (GPS) signals, such as inside a building that may block out GPS signals. Users may use their current location as a pickup location, but if the current location is based on low quality GPS signals, then the selected pickup location may be erroneous. Thus, the system may not reliably resolve, or may require more time to resolve, search queries manually input by the user. For example, a search query for a particular street name may match to multiple candidate pickup locations because many cities may include the same street name. Providing inaccurate pickup locations results in a poor user experience, which may cause users to stop using services of the network system.

SUMMARY

A network system uses Wi-Fi signals or other types of short-range transmissions to determine pickup locations for users receiving services provided via the network system. Thus, even if a given user's client device does not have reliable GPS signal reception (e.g., inside a building or underground), the network system can still determine where the given user is located and an appropriate pickup location for the given user.

Over time, the network system builds a database of search records from other users who have searched for pickup locations. In the database, the pickup locations are mapped to signatures of short-range transmissions detected by the users' client devices when they searched for their pickup locations. For instance, the signature of the Wi-Fi signal at one users' home is different from another signature of the Wi-Fi signal at a café. By comparing a signature detected by the given user's client device to the signatures in the database, the network system can check for similarities between the Wi-Fi signals. Responsive to finding a match, the network system predicts that the given user is likely to select a pickup location similar to other users whose client devices detected the signatures corresponding to the match. Accordingly, by leveraging the database, the network system can predict pickup locations without requiring the given user to input a search for a pickup location.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
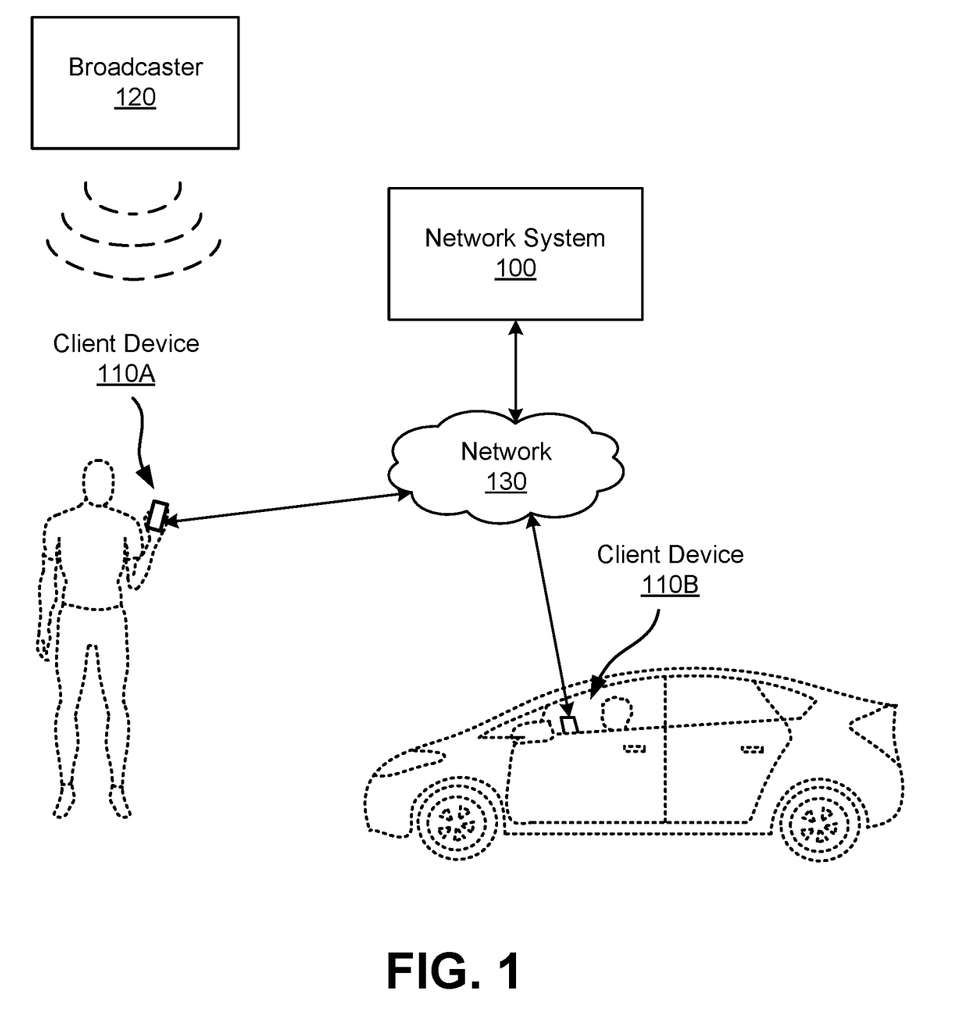
FIG. 1 is a diagram of a system environment for a network system according to one embodiment.

FIG. 1 is a diagram of a system environment for a network system 100 according to one embodiment. Users of the network system 100 may include providers that provide service to other users. In an example use case, a provider operates a vehicle to transport a user from a first location, referred to herein as a "pickup location," or "geographical pickup location," to a second location, referred to herein as a "destination location." The network system 100 may determine pickup locations and coordinate providers to pick up users at the pickup locations. Other types of service include, for example, delivery of goods such as mail, packages, or consumable items.

The system environment includes the network system 100 and one or more client devices 110 of users of the network system 100, for example, client device 110A of a user and client device 110B of a provider providing service to the user, which may collectively be referred to herein as a "client device 110" or "client devices 110." The network system 100 and client devices 110 are connected to each other via a network 130. Additionally, the system environment includes one or more broadcasters 120 that transmit short-range transmissions such as Wi-Fi, BLUETOOTH®, or infrared (IR) signals. A broadcaster 120 may be a Wi-Fi router, a BLUETOOTH® beacon, an infrared beacon, or any other suitable device that transmits short-range transmissions. In some embodiments, a broadcaster 120 is optionally connected to one or more of the other components shown in FIG. 1 via the network 130. In other embodiments, different or additional entities can be included in the system environment. The functions performed by the various entities of FIG. 1 may vary in different embodiments.

A user can interact with the network system 100 through the client device 110, e.g., to request service or to receive requests to provide service. A client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device 110 can present information received from the network system 100 on a user interface, such as a geographic map or current location of the client device 110. In some embodiments, the client application running on the client device 110 can determine the current location using one or more sensors of the client device 110, such as a global positioning system (GPS) receiver, and provide the current location to the network system 100.

In addition to a GPS receiver, the client device 110 may include other sensors such as a Wi-Fi radio (or receiver), a BLUETOOTH® radio, a camera (e.g., capable of detecting IR signals), or a motion sensor. The Wi-Fi and BLUETOOTH® radios detect short-range transmissions such as Wi-Fi and BLUETOOTH® signals, respectively. Motion sensors include, e.g., accelerometers, gyroscopes, magnetic sensors, inertial measurement units (IMUs), and the like. The motion sensors can capture telematics data describing motion or bearing of the user or a vehicle in which the user traveling. The client device 110 can provide detected signatures of the short-range transmissions along with the telematics data to the network system 100 for further processing.

In one embodiment, through operation of the client device 110, a user makes a trip request to the network system 100. The trip request provided by the client application to the network system 100 includes, for example, user identification information, the number of passengers for the trip, a requested type of the service provider (e.g., a vehicle type or service option identifier), a signature of one or more short-range transmissions detected by the client device 110, telematics data, a current location of the client device 110, or a pickup location or destination location for the trip. The user may input data for the trip request via a user interface of the client device 110. For example, the user inputs text describing the pickup or destination location for a trip using a touchscreen keyboard of the client device 110.

In some embodiments, a provider uses a client device 110 to interact with the network system 100 and receive invitations to provide service for users. For example, the provider is a person operating a vehicle capable of transporting users. In some embodiments, the provider is an autonomous vehicle that receives routing instructions from the network system 100. For convenience, this disclosure generally uses a car as the vehicle, which is operated by a driver as an example provider. However, the embodiments described herein may be adapted for a provider operating alternative vehicles (e.g., boat, airplane, helicopter, etc.) or vehicles that do not necessarily need to be operated by a person.

In some embodiments, a provider can receive invitations or assignment requests through a client device 110. An assignment request identifies a user who submitted a trip request to the network system 100 and determines the pickup location or the destination location of the user for a trip. For example, the network system 100 can receive a trip request from a client device 110 of a user, select a service provider from a pool of available (or "open") providers to provide the trip, e.g., based on the vehicle type, determined pickup location, a signature of one or more short-range transmissions, or the destination location. The network system 100 transmits an assignment request to the selected provider's client device 110.

Client devices 110 can communicate with the network system 100 via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or Wi-Fi. In some embodiments, all or some of the communication links of the network 130 may be encrypted.

II. Example System Architecture

Figure 2:
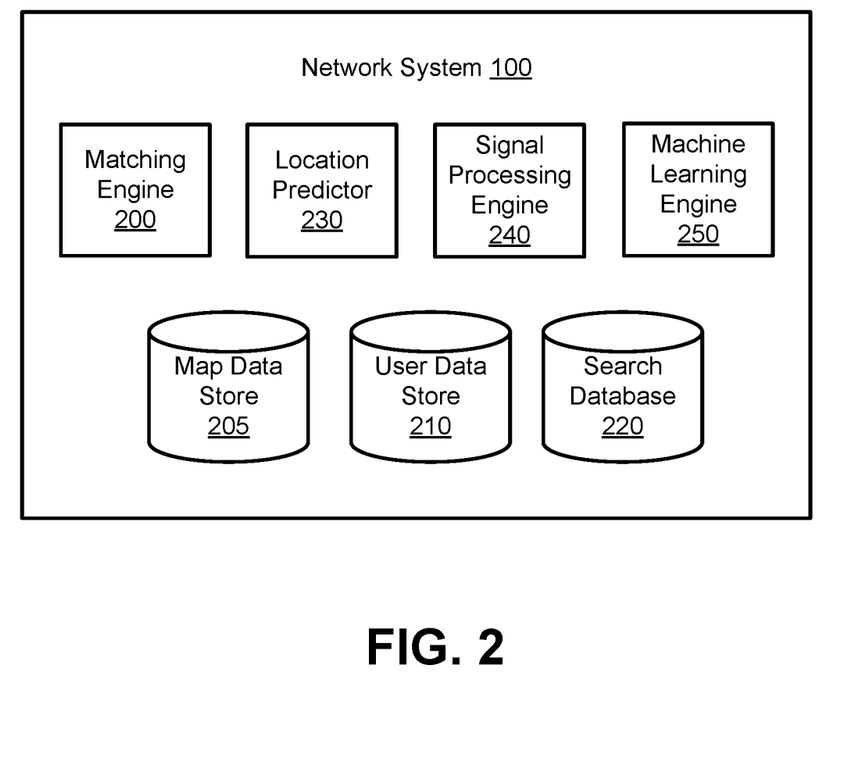
FIG. 2 is a block diagram illustrating the architecture of the network system according to one embodiment.

FIG. 2 is a block diagram illustrating the architecture of a network system 100 according to one embodiment. The network system 100 includes a matching engine 200, map data store 205, user data store 210, search database 220, location predictor 230, signal processing engine 240, and machine learning engine 250. In other embodiments, the network system 100 may include additional, fewer, or different components for various applications. Conventional components such as network interfaces, security functions, load balancers, failover servers, management and network operations consoles, and the like are not shown as to not obscure the details of the system architecture.

In some embodiments, users and providers use their client devices 110 to register with the network system 100, for example, by creating accounts and providing user information (e.g., contact information, or a home or office address) to the network system 100. The network system 100 stores the user information in the user data store 210. The network system 100 can associate feedback received from a user or data from trips (e.g., pickup or destination locations) taken by the user with the registered account of the user.

The map data store 205 stores map information of geographic regions in which the network system 100 offers services such as transportation for users. The map information may include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. The network system 100 may use the map data store 205 to determine navigation information, pickup locations, or destination locations for users.

The matching engine 200 coordinates services provided by the providers to users. In particular, the matching engine 200 selects providers to service the requests of users. For example, the matching engine 200 receives a trip request from a user and determines a set of candidate providers that are online, open (e.g., are available to transport a user), and near the requested pickup location for the user. The matching engine 200 selects a provider from the set of candidate providers to which it transmits an assignment request. Specifically, the matching engine 200 may select a provider based on, e.g., a signature of one or more short-range transmissions, the provider's location, the pickup or destination location, the type of the provider, the amount of time the provider has been waiting for an assignment request, among other factors. Further, the matching engine 200 stores search records in the search database 220. In some embodiments, a search record may include one or more reference signatures of short-range transmissions detected by a client device 110 of a user who requested a service and corresponding pickup location for the same service.

The location predictor 230 predicts pickup locations for users using the search records stored in the search database 220. In one embodiment, the client device 110 detects a signature of one or more short-range transmissions responsive to a user using the client device 110 to start a client application to request a trip via the network system 100. In a conventional system, to select the pickup location for the trip, the user manually inputs a search query indicating the pickup location, e.g., text of an address or description.

However, the location predictor 230 can predict the pickup locations without requiring a manual search query. In particular, the location predictor 230 checks for similarities between the signature detected by the client device 110 and reference signatures of the search database 220. Responsive to determining that the detected signature is similar to a candidate reference signature, the location predictor 230 predicts that the user wants to use the candidate pickup location corresponding to the same candidate reference signature. In other words, the location predictor 230 infers that users are likely to select the same or similar pickup locations (e.g., based on repeated requests from a user's home or office) if their client devices 110 detected similar signatures when the users started client applications to request services from the network system 100.

To determine similarities between signatures, the location predictor 230 may analyze the signatures using the signal processing engine 240 or one or more models trained by the machine learning engine 250. The location predictor 230, search database 220, signal processing engine 240, and machine learning engine 250 are further described below and in the example described with reference to FIGS. 3-4.

In some embodiments, the signal processing engine 240 processes telematics data captured by sensors of client devices 110 to determine one or more parameters describing a corresponding trip. For example, the signal processing engine 240 calculates a moving average or variance of the speed of a vehicle during the trip based on accelerometer data. Using the calculated moving average, the signal processing engine 240 may determine a mode of transportation, for example, whether the user is walking, or riding in a car, train, airplane, or other type of vehicle. The signal processing engine 240 may store the telematics data and parameters, associated with a trip request or search record, in the search database 220.

The machine learning engine 250 uses machine learning techniques to train a model to select candidate geographical pickup locations for users of the network system 100. The machine learning engine 250 trains models based on feature vectors derived using search records (stored in the search database 220) of a population of users of the network system 100. To generate feature vectors, the machine learning engine 250 may also retrieve information from other components of the network system 100 such as the user data store 210. The machine learning engine 250 may implement machine learning techniques such as deep learning, logistic regression, convolutional neural networks, or other types of dimensionality reduction processes.

In some use cases for training models, the machine learning engine 250 labels feature vectors based on characteristics of the search records. For example, a search record includes a signature of short-range transmissions detected by a client device 110 corresponding to a request for service, and a candidate geographical pickup location presented to the user in response to the requested service. The label indicates whether the user started the requested service at the candidate geographical pickup location included in the feature vector. That is, the feature vectors are labeled as positive (e.g., user started the service within a threshold distance from the pickup location) or negative examples (e.g., user did not start the service within the threshold distance) as feedback for training models. In some embodiments, the machine learning engine 250 determines feature vectors based on search records indicating an actual pickup location in addition, or alternatively, to a location searched for by a user. For example, suppose a user is located at a given geographical search location (e.g., inside a mall), and the user searched for a given pickup location at an intersection outside the mall. However, the user discovers that the given pickup location is not a valid pickup location, e.g., because the given pickup location is at a bus stop or another type of no parking or no stopping zone. Thus, a provider ultimately picked up the user for the requested service at an actual pickup location further down the intersection from the pickup location that the user searched for. The client device 110 of the user and/or the provider may detect the actual pickup location to associate with a search record on the network system 100. As a result, a model trained using this search record may select the actual pickup location, instead of the searched for pickup location, for future requests by other users (e.g., if the training data indicates that users at the given geographical search location and/or that searched for the given pickup location at the intersection usually tend to be picked up at the actual pickup location further down the intersection). Accordingly, when a new user is located at the given geographical search location (e.g., inside the mall), the location predictor 230 can utilize the actual pickup location further down the intersection, instead of the searched for pickup location at the intersection, as the predicted pickup location for the new user.

Thus, a machine learning model may be trained using signatures of short-range transmissions to learn which candidate geographical pickup locations are more likely to be selected or used by users, in view of certain context describing the request. For instance, the model may learn that the preferred candidate geographical pickup locations depend on conditions such as a route traveled by the user within a threshold period of time preceding the request for service, the time of day, a geographical region or country where the user is located, or a type of the service.

III. Example Broadcasters of Short-Range Transmissions

Figure 3:
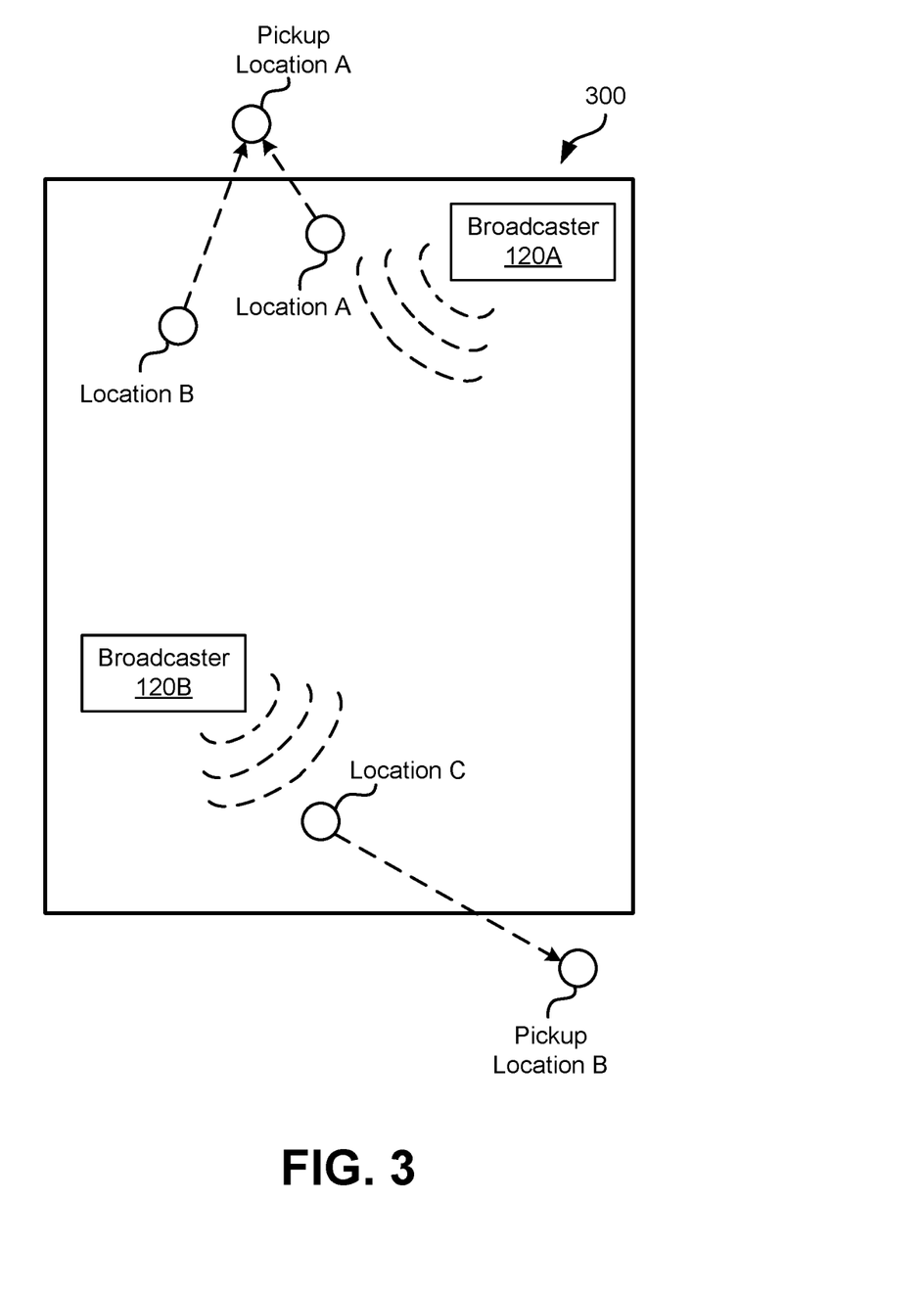
FIG. 3 is a diagram of broadcasters in a building according to one embodiment.

FIG. 3 is a diagram of broadcasters in a building 300 according to one embodiment. For example, the building 300 shown in FIG. 3 is a shopping mall that includes broadcaster 120A and broadcaster 120B. Broadcasters 120A and 120B are Wi-Fi transmitters positioned at different locations inside the mall, e.g., next to different stores or on different floors of the building. To build a database of search records, the matching engine 200 stores, in the search database 220, search records of users at various locations inside the mall. For example, a first user uses a client device 110 to search for pickup location A for a trip request while at location A (e.g., a "geographical search location"). The matching engine 200 stores a first search record including a signature of one or more short-range transmissions transmitted by broadcaster 120A and detected by the first user's client device 110 at location A. Further, the matching engine 200 maps the signature to pickup location A. A second user also searches for pickup location A for a trip request, but is located at location B. Thus, the matching engine 200 stores a second search record including another signature of one or more short-range transmissions transmitted by broadcaster 120A and detected by the second user's client device 110 at location B. The other signature is also mapped to pickup location A. Additionally, a third user searches for pickup location B for a trip request, while located at location C. The matching engine 200 stores a third search record including a signature of one or more short-range transmissions transmitted by broadcaster 120B and detected by the third user's client device 110 at location C. The matching engine 200 maps the signature to pickup location B. Signatures of short-range transmissions of search records stored in the search database 220 are referred to herein as "reference signatures."

In some embodiments, the matching engine 200 stores search records in the search database 220 for a threshold duration of time—according to a "forgetting factor"—to maintain an updated database of reference signatures. In particular, the search records are stored with a timestamp indicating when a client device 110 detected the corresponding reference signature. After the threshold duration of time (e.g., a month or 50 days), the matching engine 200 removes the search records that are out-of-date. Due to changes in map information such as construction (or destruction) of roads and points of interest (POIs), maintaining the updated database may help ensure that the search records include reference signatures and pickup locations that are still viable. For example, a shopping center temporarily closed for remodeling is not a practical pickup location, and thus users may stop requesting services having pickup locations there, at least temporarily until the shopping center re-opens. Consequently, previous search records associated with the shopping center may be excluded for predictions during the time that the shopping center is closed.

In some embodiments, the matching engine 200 maps multiple reference signatures of short-range transmissions detected by a client device 110 to a particular pickup location. For instance, in addition to mapping the reference signature detected by a user's client device 110 at a geographical search location, the matching engine 200 can also map reference signatures detected by the client device 110 during a period before or after the client device 110 is located at the geographical search location. Thus, the reference signatures may indicate a sequence of signatures mapped to a path traveled by the user, e.g., from a given location to the geographical search location, or from the geographical search location to the pickup location.

IV. Example Signatures of Short-Range Transmissions

Figure 4:
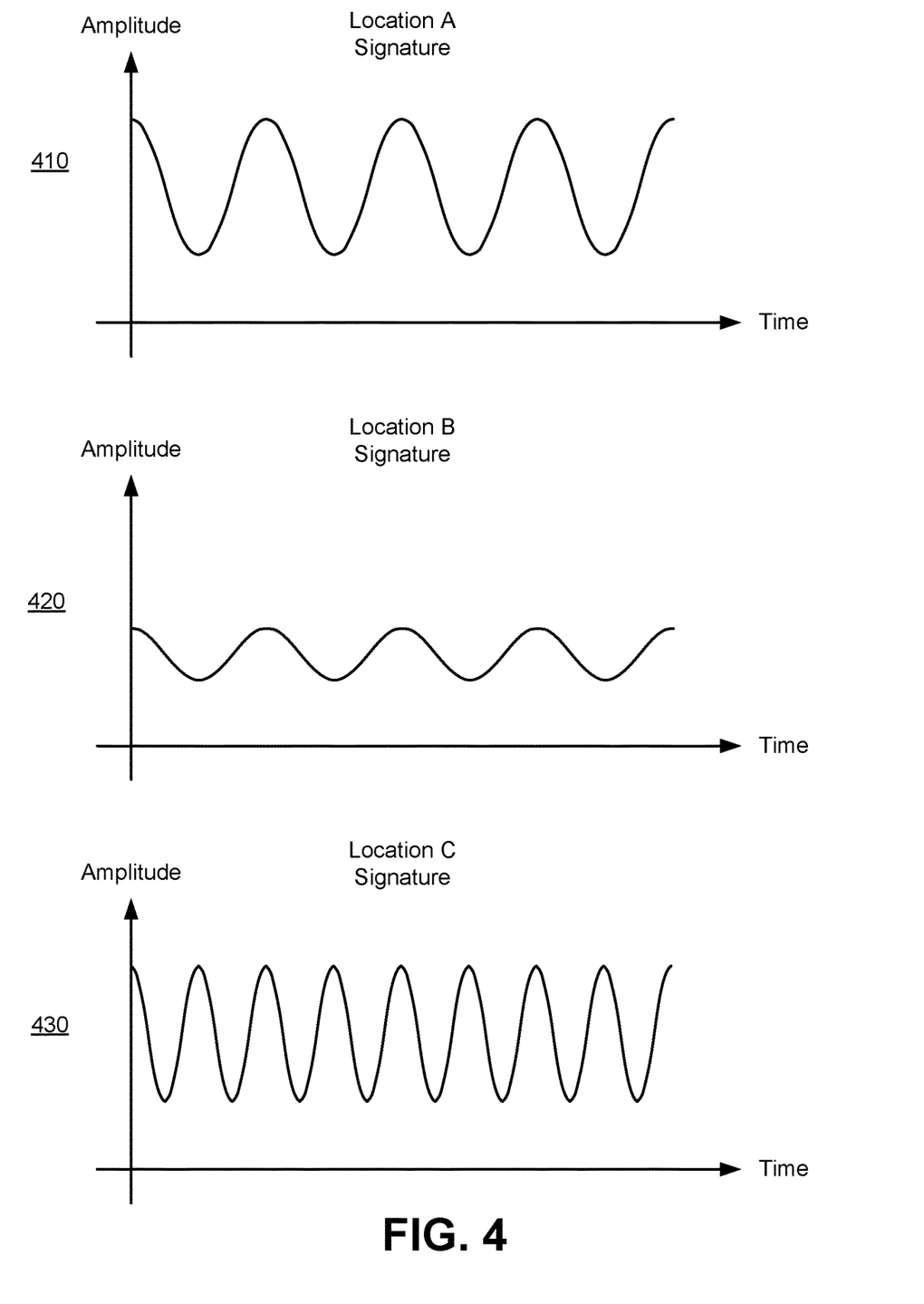
FIG. 4 is a set of diagrams showing signatures of short-range transmissions detected from the broadcasters shown in FIG. 3 according to one embodiment.

FIG. 4 is a set of diagrams showing signatures of short-range transmissions detected from the broadcasters 120A and 120B shown in FIG. 3 according to one embodiment. In particular, diagram 410, 420, and 430 show the reference signatures of short-range transmissions detected at location A, location B, and location C, respectively, as described above with respect to the building 300 shown in FIG. 3. The detected signatures may vary based on the transmissions from one or more originating broadcasters 120. For purposes of explanation, broadcasters 120A and 120B transmit short-range transmissions having different frequencies, in one embodiment. Thus, the reference signatures shown in graphs 410 and 420 have a first frequency, while the reference signature shown in graph 430 has a second frequency, which is greater than the first frequency. Further, the strength of a detected short-range transmission may decrease as a client device 110 is located further from the originating broadcaster 120. Accordingly, the peak-to-peak amplitude of the reference signature shown in graph 420 is less than that of the reference signature shown in graph 410 because location B is further away from broadcaster 120A than is location A as shown in FIG. 3.

Using the search database 220 including at least the previously described search records for locations A, B, and C, the location predictor 230 can predict candidate geographical pickup locations for users without necessarily using a search query input by the user. For example, the matching engine 200 receives a request for service from a given user at an initially unknown location, and receives a signature of one or more short-range transmissions detected by the given user's client device 110. By comparing the signature to reference signatures stored in the search database 220, signal processing engine 240 determines whether the signature is similar to a candidate reference signature based on a similarity criterion. For example, the signal processing engine 240 calculates a cosine similarity, inner product similarity, or another measure of similarity between the signature and reference signatures, or transformations of the signal strength of the signatures. Other similarity criterion may be based on, e.g., a detected Wi-Fi network name (SSID), received signal strength indicator (RSSI), Basic Service Set Identifier (BSSID) based on a media access control (MAC) address of an access point, an average frequency of the signatures, or a frequency response of the signatures. In some embodiments, the signal processing engine 240 uses machine learning techniques to refine the similarity determination or criterion. Responsive to determining that the signature matches a candidate reference signature, the location predictor 230 selects the candidate geographical pickup location mapped to the candidate reference signature.

In some embodiments, the location predictor 230 selects a candidate geographical pickup location using multiple signatures. As an example use case, a user travelling on a flight lands at an airport and walks to the baggage area. As the user waits for baggage, the user starts a client application using a client device 110 to request ground transportation via the network system 100. From the time the user started walking to the baggage area until the time the user started the client application, the client device 110 detects multiple signatures to provide to the network system 100. The location predictor 230 receives and compares these signatures with multiple reference signatures in the search database 220, e.g., using similar criterion as previously described for one-to-one comparison of signatures. By aggregating the comparison results of multiple signatures to reference signatures, the location predictor 230 can increase the confidence level of a match. For instance, the airport may have multiple baggage areas for different airlines, each with a separate pickup curb. Consequently, the location predictor 230 may not necessarily be able to determine with confidence a user's desired pickup location merely using a signature detected by the user's client device 110 on a landed airplane still on the runway. However, using multiple signatures including a signature detected at the user's baggage area, the location predictor 230 can predict that the user is likely to want to be picked up at the curb next to the same baggage area. Accordingly, by determining a signature match at both the runway and the baggage area, the location predictor 230 may generate a pickup location prediction with greater confidence, relative to a prediction using one signature match.

In some embodiments, the location predictor 230 selects a candidate geographical pickup location based on a mode of transportation of the user, as determined by the signal processing engine 240. For example, the signal processing engine 240 determines that a given user is traveling on a train and determines the next train station that the given user is headed towards based on train route information from the map data store 205. The search records in the search database 220 may indicate that users who request transportation en route to a train station frequently request a pickup location nearby the train station. The location predictor 230 can determine a match by comparing changes in signatures detected by the given user's client device 110 with changes in reference signatures detected by the other users who previously traveled a similar route. Thus, the location predictor 230 may predict that the given user is likely to request pickup nearby the next train station as well. The location predictor 230 may present (on the given user's client device 110) a pickup location at the next train station responsive to the given user accessing a client application to request service via the network system 100, and prior to the given user manually inputting a search request for a pickup location.

It should be noted that the graphs shown in FIG. 4 are for illustrative purposes. That is, client devices 110 and the network system 100 do not necessarily graph detected signatures of short-range transmission. Further, the graphs of FIG. 4 show detected signatures each originating from one broadcaster 120, though in practice, client devices may simultaneously detect short-range transmissions from multiple broadcasters 120. Thus, in some embodiments, the detected signature is a superposition of multiple short-range transmissions, each of which may have different parameters (e.g., frequency, amplitude, or SSID). The signal processing engine 240 may filter out noise from detected signatures based on one or more parameters, such as a pre-determined list of target SSIDs of Wi-Fi signals. In some embodiments, the noise may originate from autonomous vehicles nearby a client device 110. By pre-filtering a detected signature, the signal processing engine 240 may increase the likelihood of matching the signature with a reference signature, e.g., because the signature has an improved signal-to-noise ratio.

V. Example Process Flow

Figure 5:
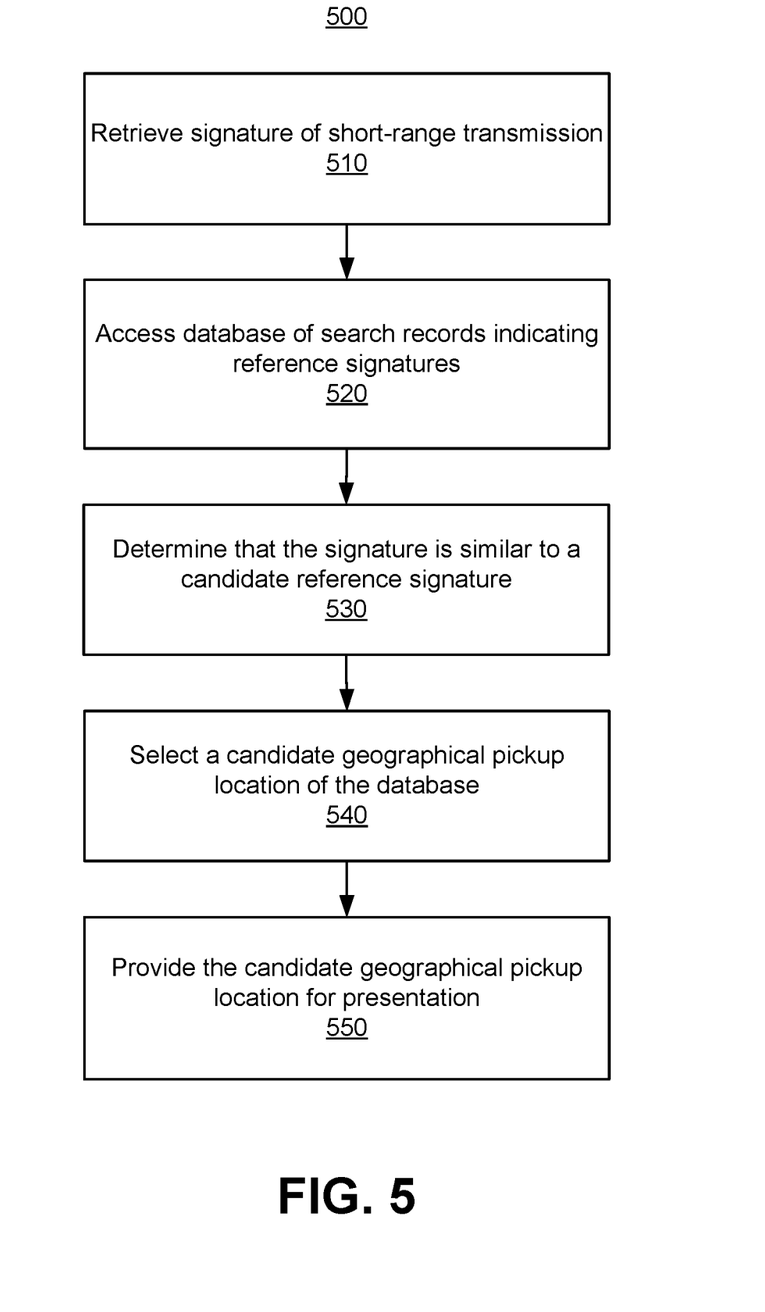
FIG. 5 is a flowchart illustrating a process for determining pickup locations according to one embodiment.

FIG. 5 is a flowchart illustrating a process for determining pickup locations according to one embodiment. In some embodiments, the network system 100 uses the process 500 within the system environment in FIG. 1. The process 500 may include different or additional steps than those described in conjunction with FIG. 5 in some embodiments or perform steps in different orders than the order described in conjunction with FIG. 5.

In one embodiment, the location predictor 230 retrieves 510 a signature of one or more short-range transmissions detected by a particular client device 110 of a particular user of the network system 100. The location predictor 230 accesses 520 a database (e.g., the search database 220) of search records indicating reference signatures. The search records are received from client devices 110 of users of the network system 100 and indicate geographical pickup locations corresponding to the reference signatures. For instance, a client device 110 of a user detects the reference signature at a geographical search location where the user searched for a pickup location for a start of a service provided via the network system 100. The location predictor 230 determines 530 that the signature retrieved in operation 510 is similar to a candidate reference signature based on a similarity criterion. The location predictor 230 selects 540 a candidate geographical pickup location of the database corresponding to the candidate reference signature. The location predictor 230 provides 550 the candidate geographical pickup location to the particular client device 110 for presentation.

VI. Example Physical Components of a Computer

Figure 6:
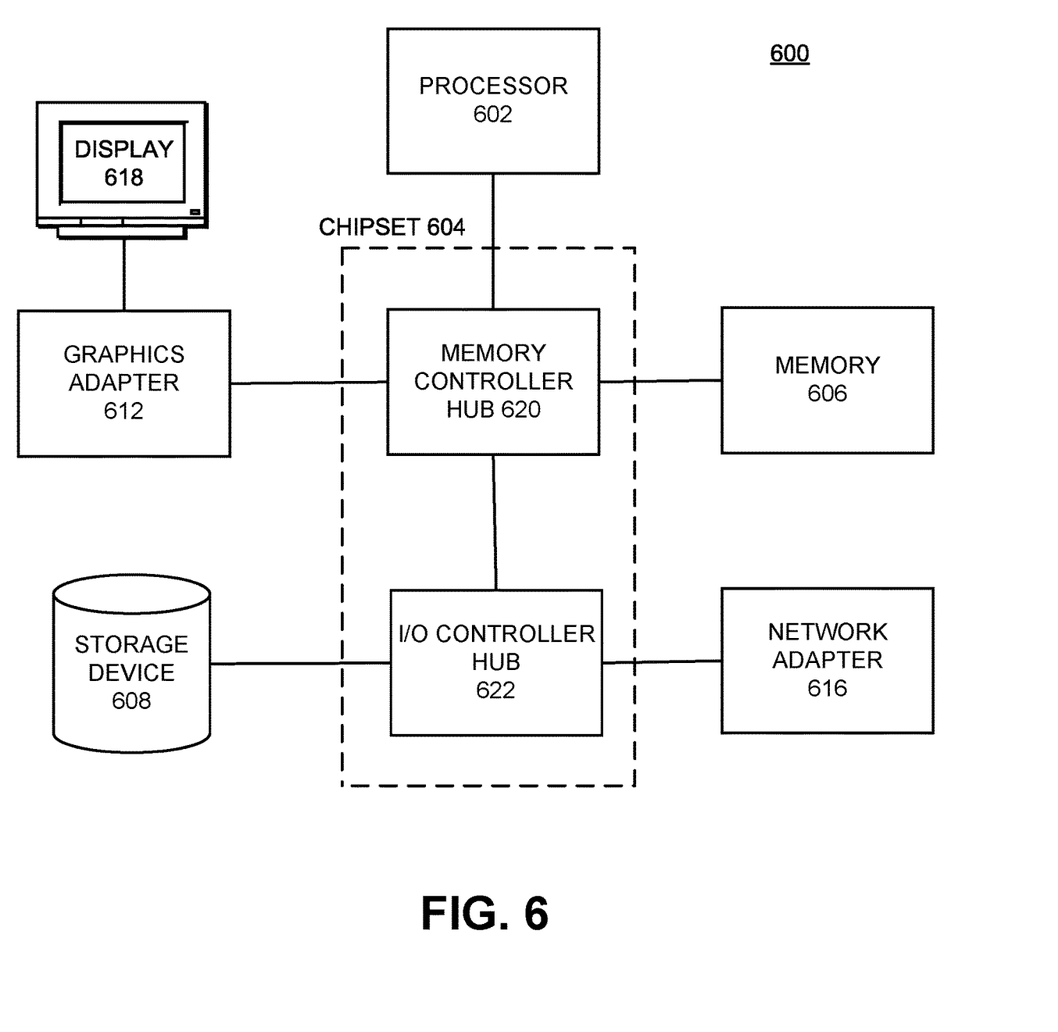
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100 or client devices 110), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

VII. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of geographic positioning using short-range transmissions, the method comprising:
   retrieving, from a particular client device of a particular user of a network system, a signature of a short-range transmission, wherein the signature has at least one frequency detected by the particular client device;
   accessing, using one or more processors, a database of search records received from a plurality of client devices corresponding to a plurality of users of the network system, each of the search records indicating at least:
   (i) a reference signature of a short-range transmission detected by a client device of the plurality of client devices at a geographical search location where a user of the plurality of users searched for a geographical pickup location for a start of a service provided via the network system, wherein the reference signature has a frequency; and
   (ii) the geographical pickup location;
   determining, using the one or more processors, that the signature is similar to a stored reference signature of the database using the at least one frequency of the signature and the frequency of the stored reference signature;
   selecting, using the one or more processors, a stored geographical pickup location of the database corresponding to the stored reference signature; and
   providing the stored geographical pickup location to the particular client device for presentation.

2. The method of claim 1, wherein the stored geographical pickup location is selected without an input search query for the provided stored geographical pickup location, and wherein the stored geographical pickup location is different than a geographical location of the particular client device when the signature of the short-range transmission is detected by the particular client device.

3. The method of claim 1, further comprising:
   receiving a request for transportation from the particular client device;
   determining that the particular user was picked up in response to the request for transportation within a threshold distance from the stored geographical pickup location;
   storing a new search record in the database, the new search record including at least the signature and the stored geographical pickup location; and
   providing the signature and the stored geographical pickup location as a positive example to train a model configured to select stored geographical pickup locations of the database for users of the network system.

4. The method of claim 1, further comprising:
   receiving a request for transportation from the particular client device;
   determining that the particular user was not picked up in response to the request for the transportation within a threshold distance from the stored geographical pickup location; and
   providing the signature and the stored geographical pickup location as a negative example to train a model configured to select stored geographical pickup locations of the database for users of the network system.

5. The method of claim 1, wherein each of the search records further indicates the geographical search location, wherein for at least one of the search records of the database, the geographical search location is different than the geographical pickup location, and wherein the reference signature was detected by the client device of the plurality of client devices before a corresponding user of the plurality of users searched for the geographical pickup location.

6. The method of claim 1, wherein at least one of the search records of the database further includes a plurality of reference signatures of short-range transmissions detected by the client device of the plurality of client devices before a corresponding user of the plurality of users searched for the geographical pickup location, and further comprising:
   receiving a plurality of signatures of short-range transmissions detected by the particular client device over a duration of time as the particular client device moves from a geographical location to a subsequent geographical location, the plurality of signatures including at least the signature; and
   determining that the plurality of signatures have a threshold similarity to a stored plurality of reference signatures of the database, the stored plurality of reference signatures including at least the stored reference signature.

7. The method of claim 6, further comprising:
   receiving telematics data generated by one or more sensors of the particular client device during the duration of time, wherein determining the threshold similarity is based at least in part on the telematics data.

8. The method of claim 7, further comprising:
   determining a rate at which the particular client device moved from the geographical location to the subsequent geographical location by processing the telematics data; and
   wherein determining the threshold similarity is further based on the rate and a comparison of a change in the short-range transmissions associated with the plurality of signatures to another change in the short-range transmissions associated with the stored plurality of reference signatures.

9. A computer program product comprising a non-transitory computer readable storage medium having instructions encoded thereon that, when executed by one or more processors, cause the one or more processors to:
   retrieve, from a particular client device of a particular user of a network system, a signature of a short-range transmission, wherein the signature has at least one frequency detected by the particular client device;
   access, using one or more processors, a database of search records received from a plurality of client devices corresponding to a plurality of users of the network system, each of the search records indicating at least:
(i) a reference signature of a short-range transmission detected by a client device of the plurality of client devices at a geographical search location where a user of the plurality of users searched for a geographical pickup location for a start of a service provided via the network system, wherein the reference signature has a frequency; and
(ii) the geographical pickup location;
determine, using the one or more processors, that the signature is similar to a stored reference signature of the database using the at least one frequency of the signature and the frequency of the stored reference signature;
select, using the one or more processors, a stored geographical pickup location of the database corresponding to the stored reference signature; and
provide the stored geographical pickup location to the particular client device for presentation.

10. The computer program product of claim 9, wherein the stored geographical pickup location is selected without an input search query for the provided stored geographical pickup location, and wherein the stored geographical pickup location is different than a geographical location of the particular client device when the signature of the short-range transmission is detected by the particular client device.

11. The computer program product of claim 9, having further instructions that when executed by the one or more processors cause the one or more processors to:
receive a request for transportation from the particular client device;
determine that the particular user was picked up in response to the request for transportation within a threshold distance from the stored geographical pickup location;
store a new search record in the database, the new search record including at least the signature and the stored geographical pickup location; and
provide the signature and the stored geographical pickup location as a positive example to train a model configured to select stored geographical pickup locations of the database for users of the network system.

12. The computer program product of claim 9, having further instructions that when executed by the one or more processors cause the one or more processors to:
receive a request for transportation from the particular client device;
determine that the particular user was not picked up in response to the request for the transportation within a threshold distance from the stored geographical pickup location; and
provide the signature and the stored geographical pickup location as a negative example to train a model configured to select stored geographical pickup locations of the database for users of the network system.

13. The computer program product of claim 9, wherein each of the search records further indicates the geographical search location, wherein for at least one of the search records of the database, the geographical search location is different than the geographical pickup location, and wherein the reference signature was detected by the client device of the plurality of client devices before the corresponding user of the plurality of users searched for the geographical pickup location.

14. The computer program product of claim 9, wherein at least one of the search records of the database further includes a plurality of reference signatures of short-range transmissions detected by the client device of the plurality of client devices before a corresponding user of the plurality of users searched for the geographical pickup location, having further instructions that when executed by the one or more processors cause the one or more processors to:
receive a plurality of signatures of short-range transmissions detected by the particular client device over a duration of time as the particular client device moves from a geographical location to a subsequent geographical location, the plurality of signatures including at least the signature; and
determine that the plurality of signatures have a threshold similarity to a stored plurality of reference signatures of the database, the stored plurality of reference signatures including at least the stored reference signature.

15. The computer program product of claim 14, having further instructions that when executed by the one or more processors cause the one or more processors to:
receive telematics data generated by one or more sensors of the particular client device during the duration of time, wherein determining the threshold similarity is based at least in part on the telematics data.

16. The computer program product of claim 15, having further instructions that when executed by the one or more processors cause the one or more processors to:
determine a rate at which the particular client device moved from the geographical location to the subsequent geographical location by processing the telematics data; and
wherein determining the threshold similarity is further based on the rate and a comparison of a change in the short-range transmissions associated with the plurality of signatures to another change in the short-range transmissions associated with the stored plurality of reference signatures.

17. A system for geographic positioning using short-range transmissions, the system comprising:
one or more processors configured for executing instructions; and
a non-transitory computer readable storage medium having instructions encoded thereon that, when executed by the one or more processors, cause the one or more processors to:
retrieve, from a particular client device of a particular user of a network system, a signature of a short-range transmission, wherein the signature has at least one frequency detected by the particular client device;
access, using one or more processors, a database of search records received from a plurality of client devices corresponding to a plurality of users of the network system, each of the search records indicating at least:
(i) a reference signature of a short-range transmission detected by a client device of the plurality of client devices at a geographical search location where a user of the plurality of users searched for a geographical pickup location for a start of a service provided via the network system, wherein the reference signature has a frequency; and
(ii) the geographical pickup location;
determine, using the one or more processors, that the signature is similar to a stored reference signature of the database using the at least one frequency of the signature and the frequency of the stored reference signature;

select, using the one or more processors, a stored geographical pickup location of the database corresponding to the stored reference signature; and provide the stored geographical pickup location to the particular client device for presentation.

18. The system of claim 17, wherein the non-transitory computer readable storage medium includes further instructions that when executed by the one or more processors cause the one or more processors further to:

receive a request for transportation from the particular client device;

determine that the particular user was picked up in response to the request for transportation within a threshold distance from the stored geographical pickup location;

store a new search record in the database, the new search record including at least the signature and the stored geographical pickup location; and provide the signature and the stored geographical pickup location as a positive example to train a model configured to select stored geographical pickup locations of the database for users of the network system.

* * * * *